Figure 1:
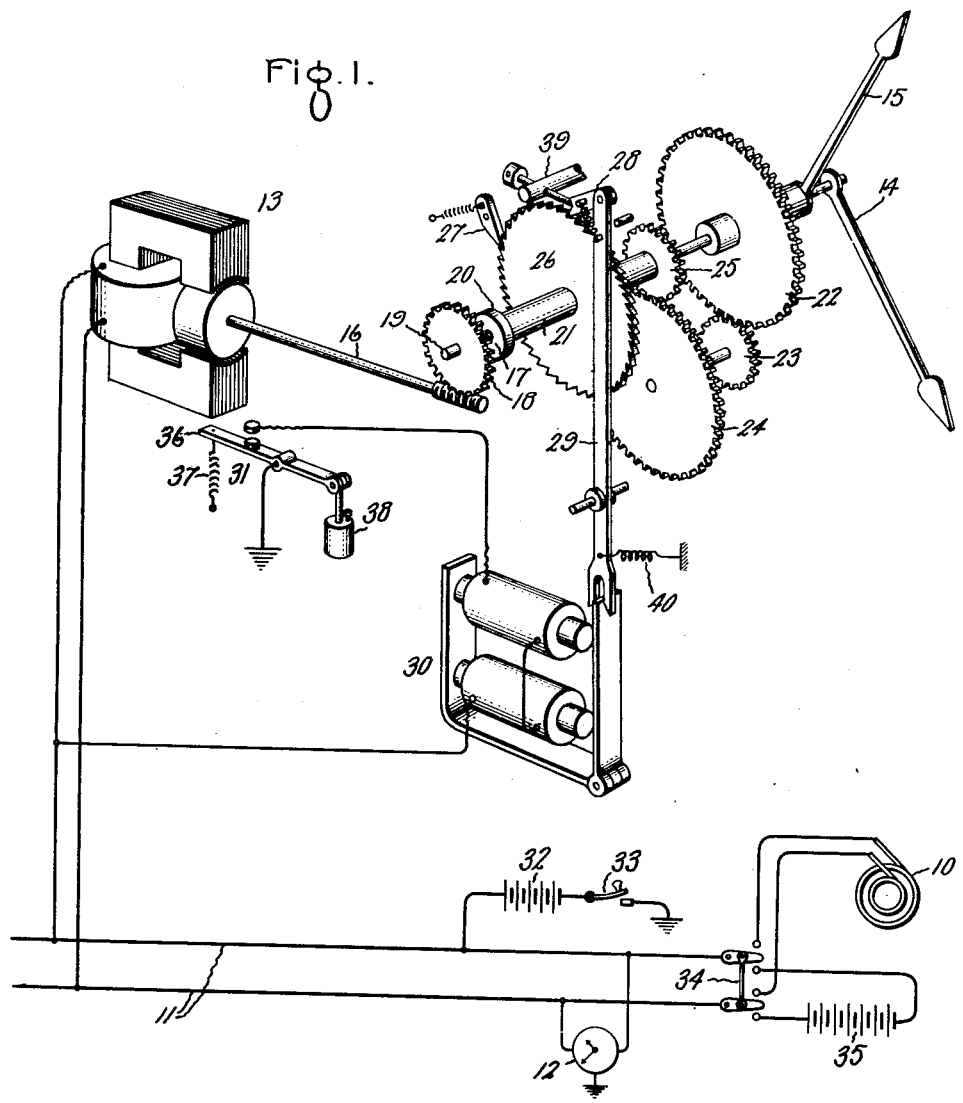

March 29, 1927.

C. A. HOXIE 1,622,588

ELECTRIC CLOCK SYSTEM

Filed Oct. 4, 1924    2 Sheets-Sheet 1

Inventor:
Charles A. Hoxie,
by *Alexander S. [signature]*
His Attorney.

March 29, 1927.

C. A. HOXIE

ELECTRIC CLOCK SYSTEM

Filed Oct. 4, 1924

1,622,588

2 Sheets-Sheet 2

Inventor:
Charles A. Hoxie,
by *Alexander S. Lunt*
His Attorney.

Patented Mar. 29, 1927.

1,622,588

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

ELECTRIC CLOCK SYSTEM.

Application filed October 4, 1924. Serial No. 741,742.

My invention relates to an electric clock system of the type where one or more secondary clocks or other timing devices are energized from an electric circuit controlled by a master clock in such a way that the secondary clocks will indicate correct time. In particular, my invention relates to mechanism for quickly resetting the secondary clocks on such a system so that they will all indicate correctly after a shut down of part or all of the system.

It is considered good practice to so regulate the frequency of extensive alternating current distribution systems so that secondary clocks or other timing devices driven by synchronous motors from the system will indicate or maintain correct time. In such a system, it sometimes happens that part or all of the system is shut down due to accidents, severe electrical storms and the like. Certain circuits only may be affected and again, different parts of the system may be shut down for different durations. After such an interruption, part or all of the secondary clocks will not be correct and in many cases, certain clocks may be slower than others. It then becomes desirable to quickly reset those secondary clocks which are slow so that all clocks will again indicate correctly. My invention relates to mechanism for accomplishing these results.

In carrying my invention into effect, I preferably utilize a secondary clock system employing self-starting synchronous motors as the normal means of operating the secondary clocks and provide in connection therewith relays which are responsive to direct current impulses for resetting the secondary clocks. Preferably I utilize the fields of the self-starting synchronous motors as relays and as thus used they become selective relays responsive to both direct and alternating current for performing different functions. The arrangement is such that additional wires to the secondary clocks are unnecessary.

The features of my invention which are believed to be novel and patentable will be pointed out in the claims appended hereto. For a better understanding of my invention, reference is made in the following description to the accompanying drawing which represents in Fig. 1 the invention applied to a single circuit system where it becomes unnecessary to provide special means to reset different clocks by different amounts and in Fig. 2 a modification of the invention by means of which the secondary clocks may be reset by different amounts to bring them into synchronism.

Referring to Fig. 1, 10 represents a source of alternating current, the frequency of which is supposed to be regulated by any suitable means so as to normally maintain it at sufficient accuracy that secondary clocks driven by synchronous motors from the distribution system represented at 11 will indicate correct time. The details of one such secondary clock is represented in the upper part of the figure and another such clock is diagrammatically represented at 12. These clocks are connected to the distribution system 11 supplied by the source 10 as represented. The secondary clocks consist of a self-starting synchronous motor represented at 13, suitably geared to the clock hands 14 and 15. In the present instance, the motor drives a shaft 16 worm geared to one member 17 of a friction clutch. This member of the friction cluth and its driving gear 18 is loose on a shaft 19. The other member 20 of the friction clutch is secured to the shaft 19 and to a sleeve 21. The minute hand 14 is also secured to shaft 19 and the hour-hand 15 is driven through reduction gears 22, 23, 24, 25 from sleeve 21. The parts thus far described constitute the normal drive for the clock hands. The resetting mechanism consists of a ratchet wheel 26 secured to sleeve 21, an advancing ratchet 28, an operating lever 29, and operating motor 30, and a selective switch 31. The resetting mechanism is operated by direct current over the tranmission line 11 and for this purpose the motor 30 and the selective switch 31 is connected between one side of the line and ground. At the control station the same side of the line is connected through a direct current source 32 and a control switch 33 to ground. A switch 34 is also provided to connect the transmission line 11 across a direct current source 35. The selective switch 31 is closed by means of the field of motor 13 when the latter is energized by direct current from the source 35. The switch lever is permanetly magnetized and is normally held away from the motor field with the switch contacts open by means of a spring 37. The other end of the lever which is pivoted near its center is attached to one member of a dash pot 38. When the motor field is normally energized by alternating current, the dash pot 38 prevents the switch from closing during that half of the cycle when the polarity of the field magnet is such as to attract the polarized lever 36. When the field member is energized by direct current in the proper direction, the pull on lever 36 is steady and of a greater magnitude and the switch closes and connects the motor 30 to ground. Then by closing and opening the key 33, direct current impulses are sent through one side of line 11, motor 30, switch 31, and the ground return. These impulses cause the operation of the lever 29 and ratchet 28 to rotate wheel 26 and the clock mechanism at a rapid rate in a direction to advance the clock hands. The friction clutch, 17, 20 allows this movement to take place, although the motor shaft 16 is stationary. Preferably, an adjustable stop 39 is provided which in addition to properly limiting the movement of the ratchet 28 is arranged to lift the ratchet from the ratchet wheel at the extremity of its forward movement. The ratchet 28 is held in the raised position by spring 40 when the motor 30 is deenergized and consequently this ratchet is disengaged from the ratchet wheel during the normal operation of the clock. A similar secondary clock will preferably be placed at the control station where the operator may observe the effect of opening and closing key 33 and in this way know when all of the secondary clocks are set correctly.

The operation may be briefly reviewed as follows: Normally, the circuit 11 will be connected to the alternating current source 10. After an interruption in the service, the switch 34 is thrown down to connect line 11 to the direct current source 35. This causes the switch contacts at 31 to close. The operator then closes and opens key 33 until the clock hands have been advanced and set to indicate substantially correctly. Then at the proper instant the switch 34 is again thrown to connect the system to the alternating current source and normal operation is resumed.

Figure 2:
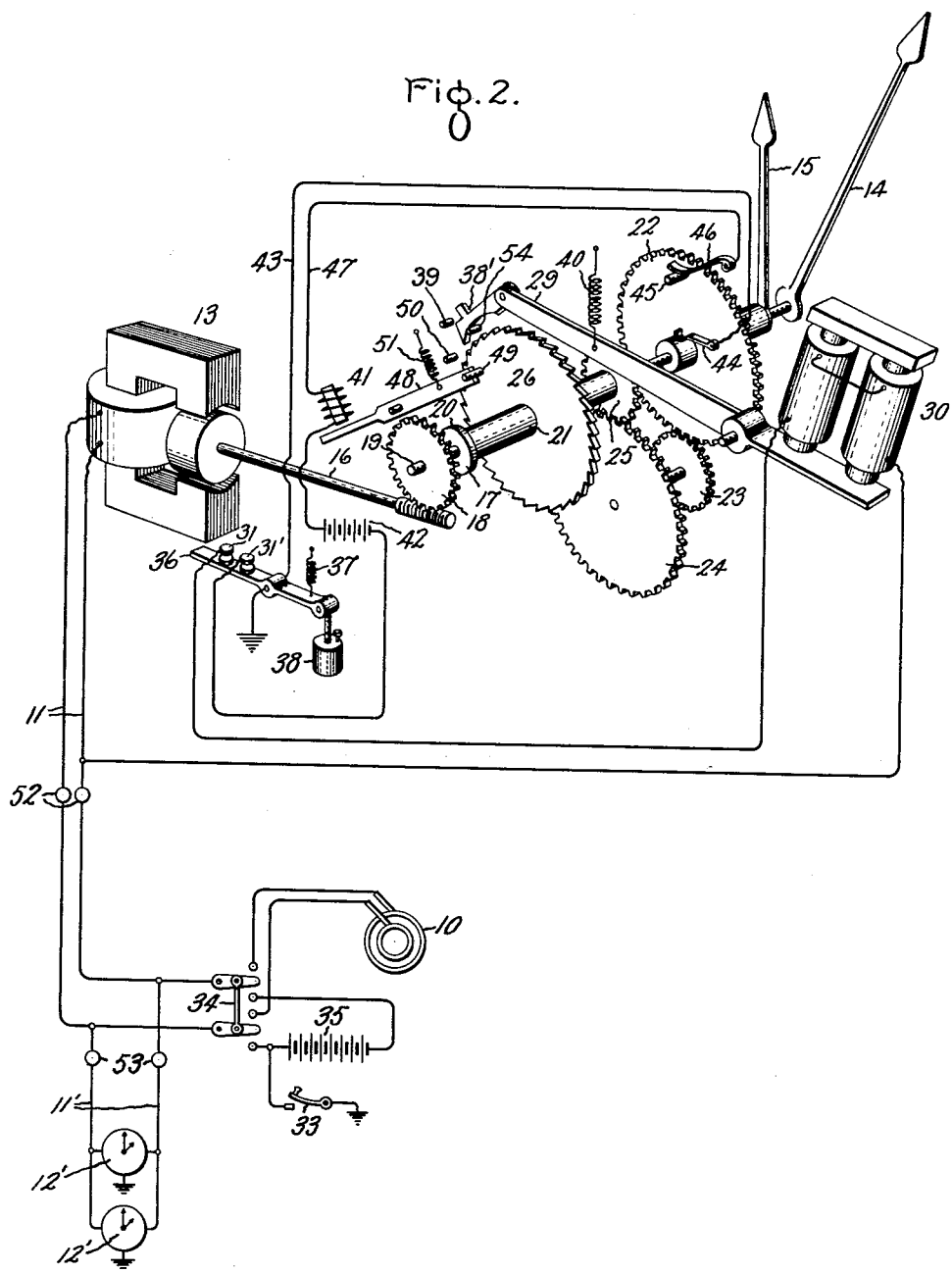

In Fig. 2 the parts indicated by the same reference numerals used in Fig. 1 are in general similar to those of Fig. 1 and perform the same functions. The system and apparatus of Fig. 2 are however arranged to perform an additional function, namely, that of first setting all of the secondary clocks on the system the same at some definite indication, for example 12 o'clock, although they may have previously differed materially and then simultaneously setting them all correctly to any other desired indication as explained in connection with Fig. 1.

The secondary clocks of Fig. 2 contain an additional motor 41 arranged to be energized from a local source 42 through a contact 31', lever arm 36, line 43, brush 44, wheel 22, pin 45, brush 46 and line 47. When energized, motor 41 is arranged to move a stop arm 48 into the path of a stop pin 49 on wheel 26 to limit the rotation of the clock work even though the ratchet mechanism 38' 29 is operated. Normally, the stop arm 48 is held against a pin 50 by means of a spring 51 and when in that position cannot engage the pin 49. The pin 49 rotates with the minute hand 14 while the contact 45 rotates with the hour hand 15. Consequently, it is only when both hands approach 12 o'clock that brush 46 contacts with contact pin 45 and stop arm 49 engages with stop pin 49 to stop the clock. The source 10 is arranged to supply at least two circuits 11 and 11', and both circuits supply secondary clocks similar to that just described, the additional secondary clocks being indicated at 12'. Now let us assume the following conditions: At say 6 o'clock, while the system is in normal operation and all of the secondary clocks are indicating correctly, an electrical storm causes the opening of circuit 11 at point 52. While this is being repaired, say at 6:30 o'clock, circuit 11' is opened at point 53. Both circuits are repaired and ready to put in service at 6:45. At this time it will be clear that the secondary clocks on circuit 11 are 45 minutes slow and those on circuit 11' 30 minutes slow. To reset the clocks correctly, the operator closes switch 34 onto the direct current source 35, which in this case also serves as the source for motor 30. This operates the selector switch lever 36 and closes the circuit of motors 30 and 41 at this point. The operator then opens and closes key 33. This advances all the secondary clocks at a rapid rate. When the secondary clocks which were only 30 minutes slow indicate 12 o'clock, they will be stopped by reason of the fact that the circuit of motor 41 is closed at 45, 46 and stop lever 48 is brought into the path of pin 49. The opening and closing of key 33 is continued. This has no effect upon the clocks which have already been brought to the 12 o'clock indication and as soon as all of the clocks are thus brought to this indication, they are stopped. Finally, all of the clocks will be set at 12 o'clock. The operator then throws switch 34 to the alternating current source. This opens the switch contacts at 31 and 31' and deenergizes motor 41. The various clocks are thus operated in synchronism as in normal operation for a few minutes until the contact 45 passes from under brush 46. Then the operator again throws the switch 34 to the direct current source and by means of key 33 resets the clocks to substantially the desired indication, as explained in connection with Fig. 1. After the clocks are thus set and indicate correctly with the master clock, the switch 34 is finally thrown to the alternating current source and normal operation is resumed.

The ratchet 38' shown in Fig. 2 has a slightly different throw out arrangement from that shown in Fig. 1. In Fig. 2 the ratchet 38' is advanced when motor 30 is energized. The under surface of the ratchet is curved and rests against a pin 54. This arrangement allows the ratchet 38' to dip down into engagement with the tooth on wheel 26 as it is advanced. When the ratchet is withdrawn by spring 40, the ratchet rides up on pin 54 out of contact with wheel 26. To ensure accuracy, a stop 39 is provided to limit the forward movement of the ratchet.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is,—

1. An electric timing system comprising an alternating current distribution system, a plurality of secondary clocks having self-starting synchronous driving motors connected to said system, electrically operated means controlled over said distribution system for setting said clocks to a desired indication irrespective of variations in their previous indication, and electrically operated means connected to said system and responsive only to direct current for establishing the control circuit for said electrically operated setting means.

2. An electric timing system comprising an alternating current distribution system, a plurality of secondary clocks having synchronous driving motors connected to said system, electrically operated means controlled over said system for setting said clocks to a desired indication irrespective of variations in their previous indications, and means influenced by said motors when energized by direct current for establishing the control circuit for said electrically operated setting means.

3. An electric timing system comprising an alternating current distribution system, a plurality of timing devices having self-starting synchronous driving motors connected to said system, electroresponsive setting mechanism for each device for advancing the device at an abnormally high rate, said setting mechanisms being operated by direct current over said distribution system, and means controlled by the synchronous driving motors when energized by direct current for establishing control circuits for the setting mechanisms and for stopping the setting operation at a predetermined setting irrespective of the continued energization of the setting mechanisms.

4. In a clock system, a secondary clock having a self-starting synchronous driving motor for normal operation, an electrically operated clock setting mechanism for advancing said clock at an abnormally rapid rate, and means controlled by said motor when energized by direct current for stopping the clock setting operation at a predetermined setting irrespective of the continued energization of said clock setting mechanism.

5. A secondary clock comprising a self-starting synchronous motor, hour and minute hand shafts driven thereby, an electromagnetic clock setting mechanism for advancing said shafts at an abnormally rapid rate, an electromagnetic lock for said shafts arranged to stop the clock setting operation at a predetermined setting, an electric circuit for said lock, contacts controlled by the hour hand shaft for making and breaking said circuit at one point and contacts at another point in said circuit closed in response to the energization of said motor by direct current.

6. An electric timing system comprising a source of alternating current. a transmission line supplied thereby, a timing device having a synchronous driving motor connected to said line for normally operating said device, a second electric motor for operating said timing device at an abnormally rapid rate, an electromagnetically operated switch responsive only to direct current for establishing a circuit to said second-mentioned motor over said transmission line, a control station, a direct current source thereat, circuit connections at the control station for connecting the transmission line to the direct current source and means at said control station for controlling the operation of said second-mentioned motor.

7. An electric timing system comprising a source of alternating current, a transmission line supplied thereby, a timing device normally driven by a synchronous motor, a second electric motor associated with said timing device, means operated by said second motor for advancing the timing device at an abnormally rapid rate, means associated with the synchronous motor of the device and responsive only to direct current for establishing a circuit to said second motor over the transmission line, a source of direct current, means for energizing said synchronous motor from said direct current source over the transmission line to thereby establish the circuit of said second motor, and separate means for controlling the energization of said second motor.

8. An electrically operated timing device comprising timing mechanism, an alternating current motor for normally operating said mechanism, a second motor for setting said mechanism, an electromagnetic switch for establishing a control circuit to said second motor, said electromagnetic switch being responsive only to direct current, and a common energizing winding for both said first mentioned motor and switch.

In witness whereof, I have hereunto set my hand this 3rd day of October, 1924.

CHARLES A. HOXIE.